UNITED STATES PATENT OFFICE.

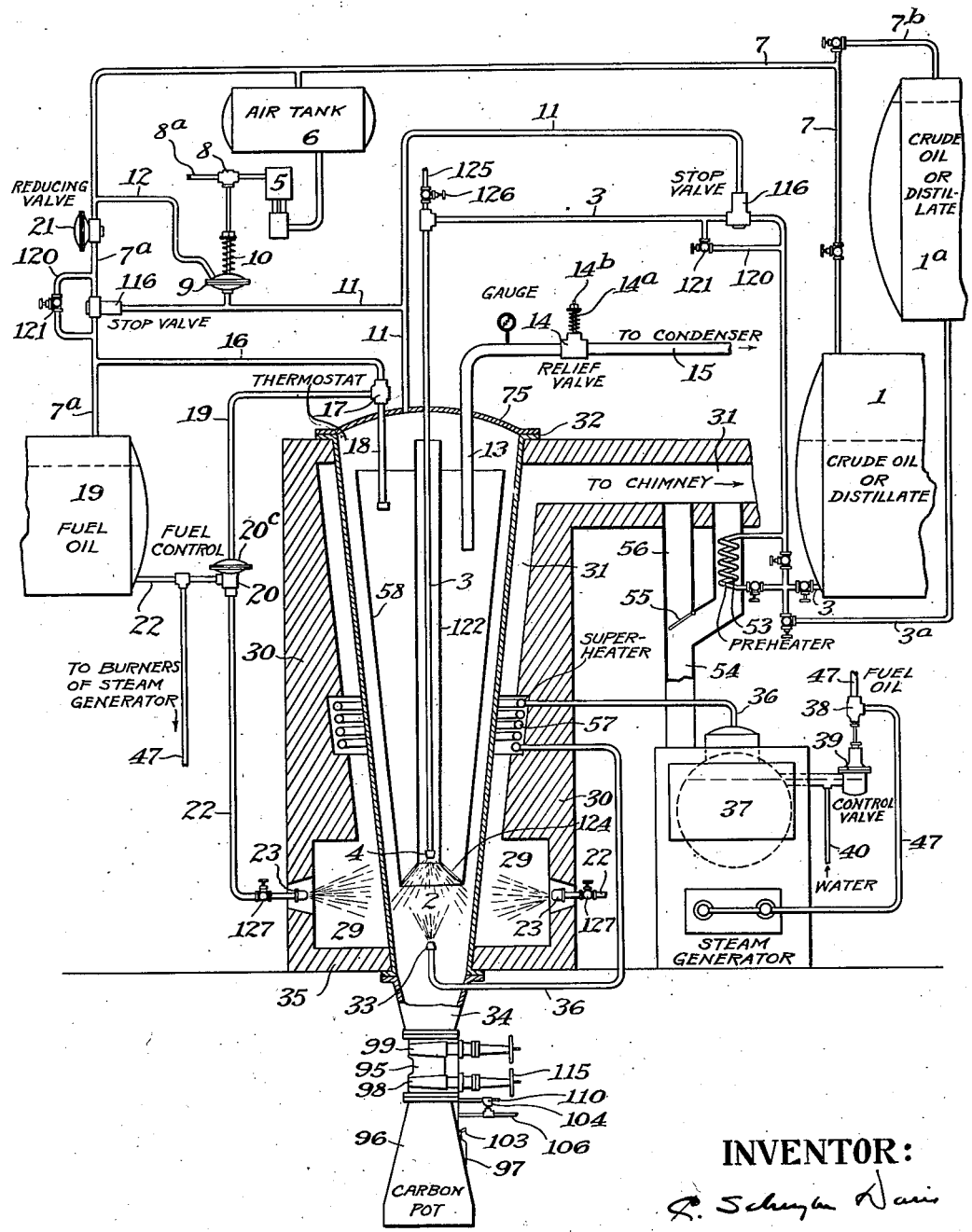

CORNELIUS SCHUYLER DAVIS, OF ROCHESTER, NEW YORK, ASSIGNOR OF ONE-HALF TO MILLARD C. ERNSBERGER, OF ROCHESTER, NEW YORK.

PROCESS FOR TREATING MATERIAL IN THE GASEOUS PHASE.

1,369,788. Specification of Letters Patent. Patented Mar. 1, 1921.

Original application filed April 30, 1917, Serial No. 165,578. Divided and this application filed July 13, 1917. Serial No. 180,320.

*To all whom it may concern:*

Be it known that I, CORNELIUS SCHUYLER DAVIS, a citizen of the United States, and resident of Rochester, in the county of Monroe and State of New York, have invented certain new and useful Improvements in Processes for Treating Material in the Gaseous Phase, of which the following is a specification.

This invention relates to a new process for treating material in the gaseous phase and for producing reaction between substances in a gaseous phase, and has for its object the rapid vaporization of the substance treated, and, when two substances are brought together, their complete intermingling in the zone of reaction, and the return to the zone of reaction of vapor and gases that have passed therefrom for treatment and to combine with gases and vapors contained therein.

More particularly this invention relates to the manufacture of gas, gasolene, benzene-toluene and other low-boiling aromatic hydrocarbons from petroleum and other hydrocarbon substances by the vapor-phase cracking process. The novel features of the process will be pointed out in the course of the specification.

The drawing shows apparatus suitable for carrying on the process, partly by diagram and partly in section.

The invention will be described with reference to the operation of this apparatus for the manufacture of gasolene from heavy petroleum hydrocarbons whose boiling points are above the cut for gasolene. Petroleum oils of all types are available for the manufacture of gasolene by this process and apparatus, and crude oils, distillates and residuum oils are all available.

The crude oil, distillate or residuum that is to be converted into gasolene is pumped into the tank 1, on the right in the drawing, from which it is fed into the reaction retort 2 through the pipe 3 that leaves the oil supply tank 1 near the bottom and terminates with a spray nozzle 4, located within the lower part of the reaction retort 2. The oil supply within the tank is under constant uniform pressure so that a uniform rate of feed is maintained. Inasmuch as the discharge orifice of the spray nozzle 4 is of fixed area the quantity of oil fed to the reaction retort 2 is determined by the effective pressure under which the oil is delivered to said retort.

Pressure is maintained on the oil within the supply tank 1 by means of an air pump 5. The air is preferably compressed in a tank 6 that has direct connection with the oil supply tank 1 through the pipe 7, and suitable means are provided for maintaining the pressure on the oil constant. For example, the valve 8 that controls the admission of steam to the pump 5 is under control of a motor 9, which is a simple diaphragm regulator that operates on the steam valve 8, the spring 10 and retort pressure through the pipe 11 tending to open said steam valve 8 against the pressure of the tank 6, through the pipe 12, so that steam is admitted to the pump from the pipe 8$^a$.

The effective feeding pressure will be the difference between the pressure under which the oil is fed to the reaction retort 2 and the pressure maintained within said retort. The pressure within the retort 2 is maintained by controlling the discharge of the gases therefrom. The gases are discharged from the retort 2 through the outlet pipe 13 controlled by a valve 14, whence they pass through the pipe 15 to a condenser of suitable construction, not shown in the drawing.

The reaction retort is shown heated by gas or oil burners in order that the temperature may be regulated automatically. In the drawing oil burners are represented, and a system of regulation is shown that can be controlled by the thermostat.

In the form shown the fuel oil is contained within a tank 19, and is kept under constant, uniform pressure by connection through the pipe 7$^a$ with the air tank 6, a suitable reducing valve 21 being employed to meet the requirements for a lower pressure on the fuel oil from that likely to be maintained on the oil feed tank 1. From the fuel oil tank 19 the oil is carried through pipe 22 to the burners 23. A thermostat 18 of suitable construction controls a valve 17 that in turn controls the admission of compressed air from the pipe 16 through the pipe 19 for the operation of the valve 20, which controls in turn the supply of fuel oil to the burners. In this valve the air pressure controlled by the thermostat acts on a diaphragm to close the valve 20 against the action of a spring. The cover of this valve is identified by 20°.

The reaction retort is set within a furnace of suitable construction. The drawing represents the burners as directing their flame into a space 29 around the lower portion of the reaction retort. The hot gases pass upwardly from this space 29, between the surface of the reaction retort and the brick work 30 to a flue 31 and thence to the stack (not shown). The reaction retort 2 is suspended within the furnace by its flange 32. It tapers from top to bottom so as to obtain a large heating surface.

Provision is made for spraying into the retort 2 for reaction another substance, if desired, besides that discharged into it from the nozzle 4 (which may be oil or some other substance), and this is done in such a way that the sprays are thoroughly blended and put in a state of high agitation.

In the drawing, oil is represented as being discharged into the retort 2 from the nozzle 4, and steam is represented as being discharged into the retort 2 from the second spray nozzle 33. The spray nozzle 33 is shown below the spray nozzle 4 and at some distance therefrom. Both are located within the lower portion of the reaction retort 2, so that the spray from the two nozzles mingles and is caused to spread in the form of mist and to circulate rapidly within this part of the reaction retort 2.

The lower end of the reaction retort 2 may terminate, as shown, in a separate extension 34 that is bolted to the reaction retort proper beneath the floor 35 of the furnace. The steam pipe 36 enters the reaction retort through this extension from a steam generator 37.

Provision is made for delivering to the reaction retort 2 substantially a constant uniform weight of steam at substantially uniform temperature. This is accomplished by means of the fuel and water control valves 38 and 39. The admission of water to the steam generator 37 through the pipe 40 from a source of water supply under adequate pressure is controlled by a valve which is operated by a float. The float will maintain the water at the desired level within the generator.

The steam generator is represented as heated by one or more oil burners (not shown) that are supplied with fuel oil from the tank through the pipe 47, under control of said valve 38. The valve proper is normally held open by a coiled spring. By adjusting the tension of the spring any desired pressure may be maintained, and inasmuch as the discharge orifice of the spray nozzle 33 is of fixed area the quantity of steam fed to the retort 2 is proportionate to and determined by the excess of the pressure maintained in the steam generator 37 over the pressure at the time prevailing within the reaction retort 2.

Provision is made for delivering both oil and steam to the reaction retort 2 as highly heated as conditions will allow. The oil is preheated by means of a coil 53, which is part of the oil feed line 3, and which is located within the flue 54 through which the products of combustion pass off from the steam generator 37. It is desirable to preheat the oil as high as possible without producing a deposit within the feed pipe. In order to regulate the preheating with this in view a damper 55 is provided whereby more or less of the hot products of combustion may be shunted through another flue 56. In adjusting the damper 55, by a chain or other suitable means not shown in the drawing, allowance must be made for heat which the oil will receive in its passage through that part of the feed pipe 3 that is located within the reaction retort.

The steam, on the other hand, should be superheated as high as the piping will permit it to be heated. To that end the steam pipe 36 is coiled at 57 within the furnace of the reaction retort.

Other material besides steam (oil for example) can be heated and vaporized and automatically fed into the reaction retort 2, through one of the nozzles 4 or 33, in uniform quantities under a pressure above that prevailing within the retort, by means of the generator 37 and its control valves and preheating means.

Steam is not necessarily employed in cracking hydrocarbons or in treating other substances for which the apparatus may be used.

Within the reaction retort 2 is a drum 58. This drum is tapered from top to bottom to correspond with the taper of the retort 2. It is of smaller diameter than the retort 2 so that between the outer surface of the drum and the inner surface of the retort 2 there is a comparatively narrow circumferential space extending from the bottom of the retort 2, where the oil is sprayed into it, to its upper end.

In cracking hydrocarbons more or less carbon is produced. The carbon falls down through the neck 95, which is normally open, into the carbon-pot 96 from which it can be removed through the door 97. A gate valve 98 in the neck 95 is closed when the carbon is to be removed and before the clean-out door 97 is opened, and as a safety precaution a second gate 99 is provided which is also normally open, but closed when the door 97 is to be opened.

An important feature of the invention is found in the returning of the permanent gases to the cracking zone (the zone of reaction) and the mixing of these with the oil as it is sprayed into the retort. In the cracking process permanent gases $CH_4$, $H_2$, $C_2H_6$, etc., are formed, which, being lighter than the condensable hydrocarbons, pass quickly out of the sphere of reaction, resulting in a tendency to produce these gases, and, when gasolene is being manufactured, in the production of unsaturated hydrocarbons.

Surrounding the oil feed pipe 3 and nozzle 4 is a pipe 122 that is open at both ends. The nozzle 4 as it discharges from the lower end of this pipe 122 serves as an aspirator to suck into the pipe 122 at its upper end the light permanent gases that accumulate in the top of the retort and discharge them with the oil that is sprayed from the nozzle 4. By this new process the permanent gases, including so much of the gases produced by the decomposition of the steam or other material introduced into the retort through the nozzle 33 as fails in the first instance to combine with the hydrocarbons, are again brought into intimate relation with the hydrocarbon particles at the moment most favorable to reaction.

Furthermore, the discharge from the nozzle 4, and if the pipe 122 is used, the combined discharge of vapor and gas operates to produce an aspirator effect upon the vapors contained within the drum 58, so that the heavier vapors which settle to the bottom of the drum and those vapors that may not have been sufficiently converted flow in over the top of the drum 58, and are drawn down through the drum and out through the open end 124 of the drum, thus producing a general circulation of the unconverted vapors also through the retort, that sends them a second time through the cracking zone. This has been found to be an important part of the invention. The bottom of the discharge pipe 13 is below the top of the pipe 122, so that the permanent gases are kept within the retort. This circulation of the heavier hydrocarbons is also a feature of the invention.

It has been found that the hydrocarbons stratify within the drum 58 so that the heaviest and those remaining uncracked after passing through the zone of reaction settle within the drum till they come within the influence of the suction produced by the discharge from the nozzle 4 and are drawn back into the zone of reaction. The end 124 of the drum is so shaped as to make an effective aspirator in combination with the nozzle 4, the exact proportions and relative arrangement of these parts depending somewhat on experiment. The shape and arrangement depend to some extent upon the dimensions of the parts, the velocity with which the material is ejected from the nozzle, and the rapidity at which the vapor is to be moved from the drum into the zone of reaction. The same is true with respect to the aspirating effect produced through the pipe 122 by the discharge from the nozzle 4.

This application is a division of application Serial No. 165,578, filed April 30, 1917.

While the drawings and description describe this invention with reference to the treatment of petroleum hydrocarbons, it is believed that the process and apparatus can be used for treating other materials in the gaseous phase, and it is not intended to disclaim or abandon any uses to which the process or apparatus can be applied.

What I claim as my invention and desire to secure by Letters Patent is:

1. The process of treating petroleum hydrocarbons in the gaseous-phase, which comprises discharging the material in attenuated form into a retort, maintaining within the retort a temperature of dissociation, recirculating through the zone of dissociation heavier vapors and gases produced, withdrawing them from the retort, and condensing the condensable products of the reaction.

2. The process of treating petroleum hydrocarbons in the gaseous-phase, which comprises discharging the material in attenuated form into a retort, maintaining within said retort a temperature of dissociation, stratifying within the retort at a point beyond the zone of dissociation condensable vapors and gases produced, continuously returning to the zone of dissociation part of the fixed gases to combine with the components of the hydrocarbons being decomposed, and withdrawing from the retort and condensing the condensable products of the reaction.

3. The process of treating petroleum hydrocarbons in the gaseous-phase, which comprises discharging the material in attenuated form into a retort, maintaining within the retort a temperature of dissociation, stratifying at a point beyond the zone of dissociation the vapors and gases produced, returning to the zone of dissociation for dissociation vapors of the lower strata that have passed beyond said zone, and withdrawing from the retort and condensing the condensable products of the reaction.

4. The process of treating petroleum hydrocarbons in the gaseous-phase, which comprises discharging the material in attenuated form into a retort, maintaining within the retort a temperature of dissociation, separating at a point beyond the zone of dissociation condensable vapors and gases produced by dissociation, continuously returning to the zone of dissociation part of the fixed gases produced by dissociation to combine with the components of the hydrocarbons being decomposed, withdrawing and condensing the condensable products of the reaction, and returning to the zone of dissociation part of the heavy vapors that have passed beyond said zone.

5. The process of treating petroleum hydrocarbons in the gaseous-phase, which comprises discharging the same in attenuated form continuously into the lower part of a retort, subjecting the material to the temperature of decomposition, removing the condensable vapors resulting from the reaction from the retort at a point sufficiently below its top to permit the accumulation of gases above said outlet, and inducing back into the zone of reaction some of the lighter gases that collect through statification in the retort above the inlet and outlet.

6. The process of treating petroleum hydrocarbons in the gaseous-phase, which comprises discharging the same in attenuated form continuously into the lower part of a retort, subjecting the material to the temperature of decomposition, removing the condensable vapors resulting from the reaction from the retort at a point sufficiently below its top to permit the accumulation of gases above said outlet, and aspirating some of the lighter gases that collect above the outlet and inlet through stratification by the current induced by the material as it enters the retort.

7. The process of treating material in the gaseous-phase, which comprises discharging the material in attenuated form into a retort at one end thereof, conducting the vapor in a thin stream toward the other end of the retort between the surface of the retort and a parallel wall, returning part of the vapor to the point where the material enters the retort along the back of the parallel wall, heating the retort to the temperature of dissociation, and withdrawing and condensing the condensable vapors.

8. The process of treating petroleum hydrocarbons in the gaseous-phase, which comprises discharging the material in attenuated form into a retort, heating the retort to the temperature of decomposition, returning part of the gases and vapor to the point where the material enters the retort from a point to which they have passed in the current flowing toward the outlet leading from the retort, to mingle with the material entering the retort, and withdrawing the vapors from the retort.

9. The process of treating hydrocarbons in the gaseous-phase, which comprises discharging the material into a retort under pressure, vaporizing the material in one part of said retort, stratifying it in another part of said retort, and utilizing the forceful discharge of material into the retort to draw back into the said first mentioned part some of the stratified vapor from a selected point within the stratifying part.

C. SCHUYLER DAVIS.